UNITED STATES PATENT OFFICE.

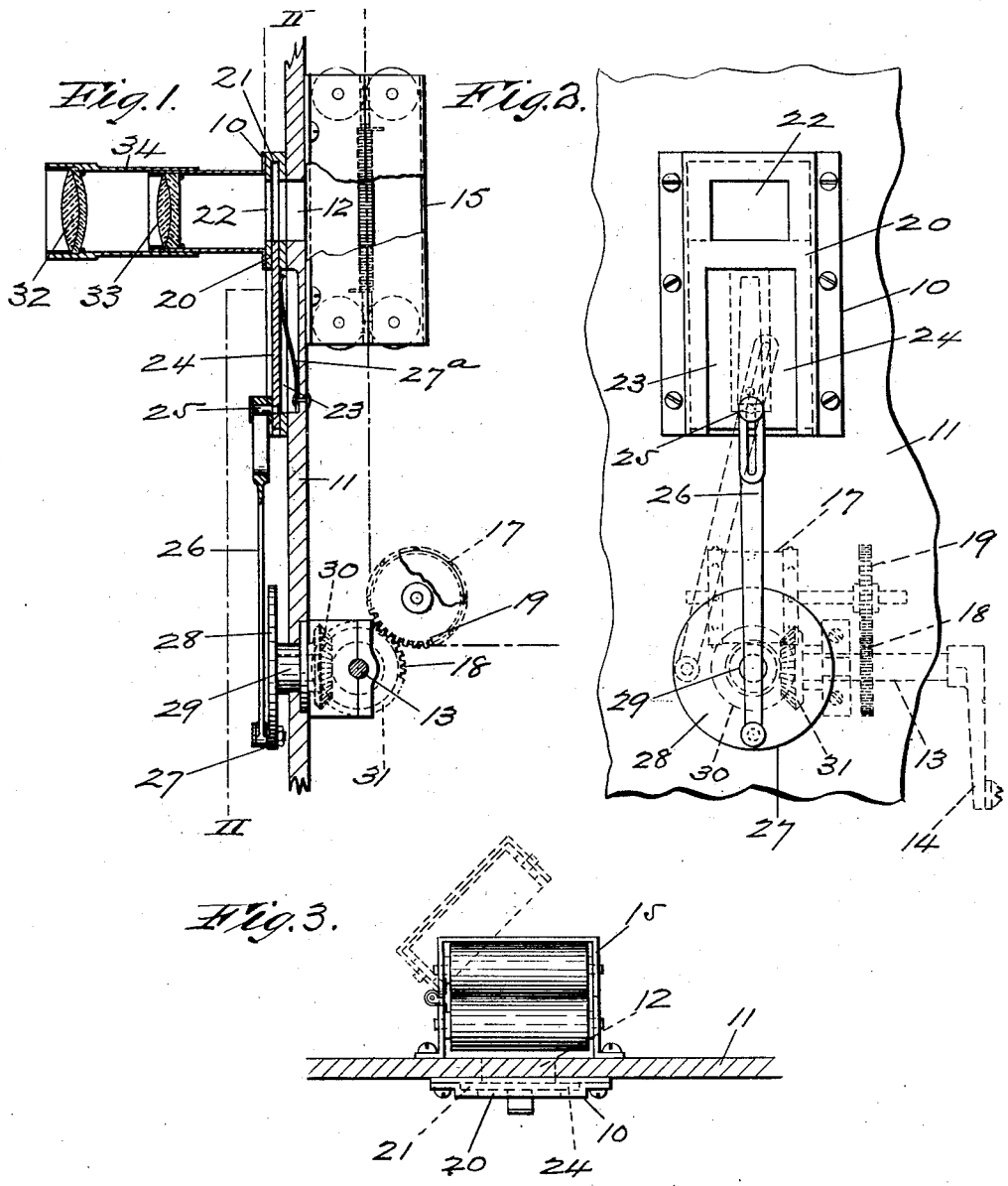

FREDERICK W. HOCHSTETTER, OF NEW YORK, N. Y., ASSIGNOR TO H. P. PATENTS AND PROCESSES COMPANY, INC., A CORPORATION OF NEW YORK.

SHUTTER FOR CAMERAS.

1,188,074.  Specification of Letters Patent.  Patented June 20, 1916.

Application filed June 20, 1913. Serial No. 774,866.

*To all whom it may concern:*

Be it known that I, FREDERICK W. HOCHSTETTER, a subject of the Emperor of Germany, and a resident of New York, county and State of New York, have invented a certain new and useful Improvement in Shutters for Cameras, of which the following is a full, clear, and exact specification.

This invention relates to a class of devices adapted to be used in conjunction with cameras.

My invention has for its object primarily to provide a device or shutter designed to be applied especially to forms of cameras used for producing moving picture films whereby the sensitized film may be consecutively exposed to the rays of light focused thereon through the medium of one or more lenses employed for photographing scenes, or various objects, made wherein is employed an opaque plate which is intermittently guided before the exposure window of the camera to cut-off the light at successive intervals upon the film as it is transmitted through the camera.

Another object of the invention is to provide mechanism serving to impart a reciprocatory movement to the opaque shutter from the drive shaft of the camera whereby the intermittent shutting-off of the light by the shutter will conform with the regular operation of other parts of the camera.

A further object of the invention is to provide a shutter which is susceptible of being made in various sizes and shapes so as to be adapted for use in conjunction with cameras of different types.

A practical embodiment of the invention is represented in the accompanying drawing forming a part of this specification in which similar characters of reference indicate corresponding parts in all the views, the said invention being more fully described hereinafter, and then pointed out in the appended claims.

In the drawing, Figure 1, is a fragmentary section, partly in detail, taken vertically through the front of a camera, with one form of my shutter applied thereto. Fig. 2 is a fragmentary view of the front plate of the camera, showing an elevation of the shutter as taken on the line II—II of Fig. 1, and Fig. 3 is a fragmentary view partly in detail and partly in section, looking down upon the part of the camera and the shutter shown in Fig. 1.

The device, or shutter has a guide plate, or frame 10 adapted to be secured by screws, or otherwise to the front wall 11 of the casing of a camera having an exposure window 12, a drive shaft 13 which is driven by a crank handle 14, and a framing device, as 15, of any suitable form adapted to guide a sensitized film 16 to a sprocket drum, as 17, which receives its rotation from the drive shaft through the medium of gears 18 and 19.

The guide plate, or frame 10 of the shutter is preferably substantially rectangular in shape, and a greater portion of the central part thereof is struck outwardly, as at 20, so as to extend from the front wall 11 of the camera whereby a recess 21 is provided between said front wall and the extending portion 20 of the guide frame. Through the upper part of the extending portion 20 of the guide frame is a window 22 which is in register with the exposure window 12 of the front wall of the casing of the camera, and in the lower part of said extending portion is an opening 23.

Adapted to be reciprocated in the recess 21 of the guide frame is a plate, or shutter 24 which is made of any suitable opaque material, and said shutter is of a length to extend approximately from the lower edge of the guide frame 10 to the lower margin of the window 22 thereof so as to control the projection of the light through the window 22 and through the window 12 when reciprocated.

To a pin 25 provided in proximity to the lower part of the shutter 23 is revolubly held the yoke, or slotted end of a lever, or crank arm 26 of a mechanism 27 adapted to impart a reciprocatory movement to the shutter when the drive shaft of the camera is driven, and serving to yieldingly force the shutter toward the guide frame is a spring 27ª. The opposite end of the crank arm 26 is pivoted eccentrically to a disk 28 held upon a stud, or short shaft 29 which is journaled in the front wall 11 of the casing of the camera. Also upon the stud 29 is a bevel gear 30 which is in mesh with a bevel gear 31 held upon the drive shaft 13 of the camera. Thus when the crank handle 14 is turned for operating the camera the shutter 24 will be reciprocated in the recess 21 of the guide frame 10 for intermittently cutting-off the exposures of the light upon the sensitized film which is projected therefrom through the medium of one, or more lenses, as 32 and 33, provided in an adjustable barrel, as 34, of the usual form as is customary when photographing scenes, or other objects to produce moving picture films.

In the foregoing description, I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope of the appended claims.

Having thus described my invention, I claim as new and desire to secure by Letters Patent:—

1. In a shutter mechanism for cameras, the combination with the front wall of a camera having an exposure window, an objective in front of said window, and means for moving a sensitized film by the opening for exposure to the rays of light focused thereon; of a guide frame secured to the front wall and having an offset central part spaced from said front wall to provide a recess therebetween, said frame having a window alining with said exposure window, said frame recess being closed at one end and open at the other end, a plate slidable in the recess of said guide frame and means operatively connected to the film moving means for reciprocating the plate therewith.

2. In a shutter mechanism for cameras, the combination with the front wall of a camera having an exposure window, an objective in front of said window and means for moving a sensitized film by the opening for exposure to the rays of light focused thereon; of a guide frame secured to the front wall and having an offset central part spaced from said front wall to provide a recess therebetween, said frame having a window alining with said exposure window, said frame recess being closed at its top and open at its bottom, a shutter plate mounted in the recess for movement to cover and uncover the windows, spring means between the front wall and plate for forcing the latter outward against the frame, and a crank connection between the plate and film moving means for intermittently cutting off the exposures of the light upon the film and exposing the same.

3. In a shutter mechanism for cameras for producing moving picture films, the combination with the front wall of a camera having an exposure window, a framing device in rear of said window, and a film moving means comprising in part a hand operated film engaging drum; of a guide frame in front of said window and having a recess, a plate mounted in said recess, said frame having a window in front of said exposure window and an opening spaced therebeneath, an objective in front of said window on the frame, said shutter being adapted to uncover said windows when lowered, a stud geared to the film moving means and having a crank disk, a crank rod having slotted connection with the plate and eccentrically connected to the disk whereby operation of the film moving means will cause reciprocation of the plate, and a spring carried by the front wall and pressing outward against the plate to hold the latter against the outer portion of the frame.

This specification signed and witnessed this nineteenth day of June A. D. 1913.

FREDERICK W. HOCHSTETTER.

Witnesses:
ROBT. B. ABBOTT,
M. DERMODY.